INVENTORS.
REUBEN C. BAKER
THOMAS M. RAGAN,
By
Mellin and Hanscom
ATTORNEYS

June 19, 1956  R. C. BAKER ET AL  2,750,911
ROTATABLE, EXPANSIBLE WELDING FIXTURE
Filed Sept. 26, 1949  4 Sheets-Sheet 2
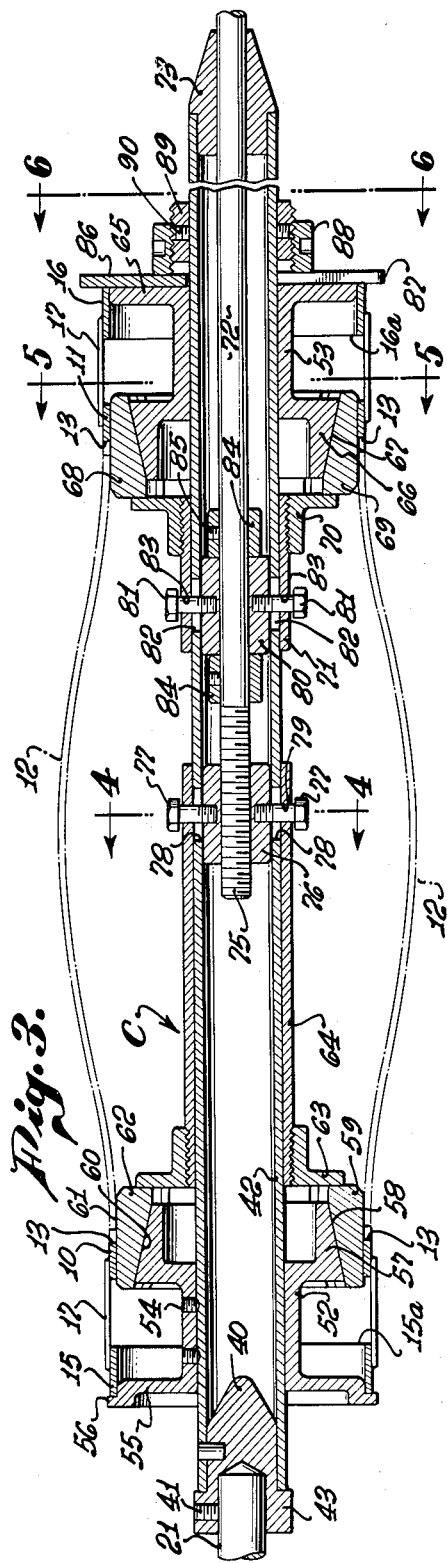
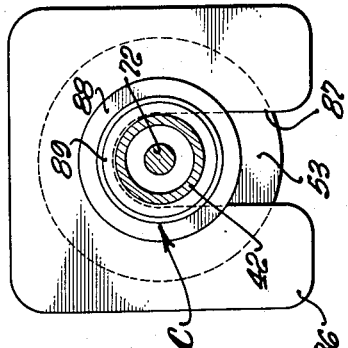
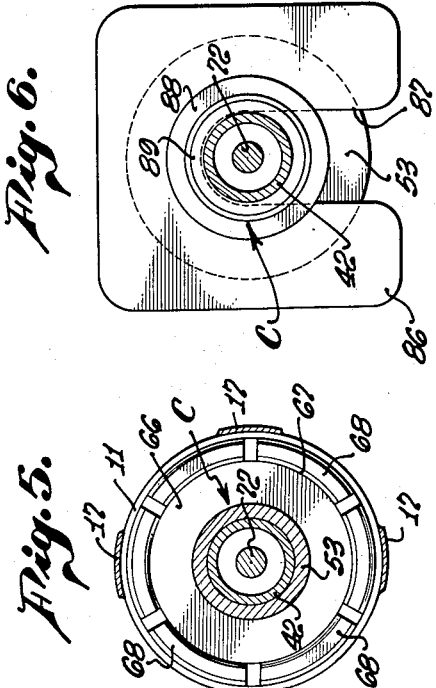
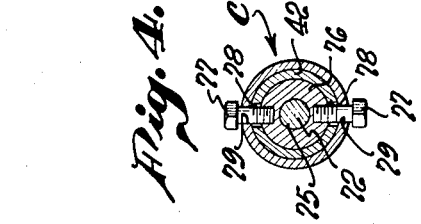
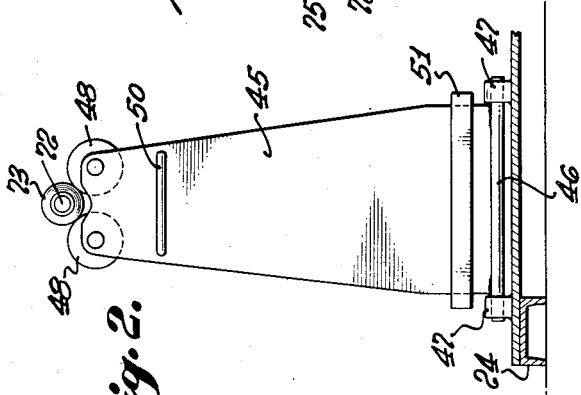
INVENTORS.
REUBEN C. BAKER,
THOMAS M. RAGAN,
By Mellin and Hanscom
ATTORNEYS

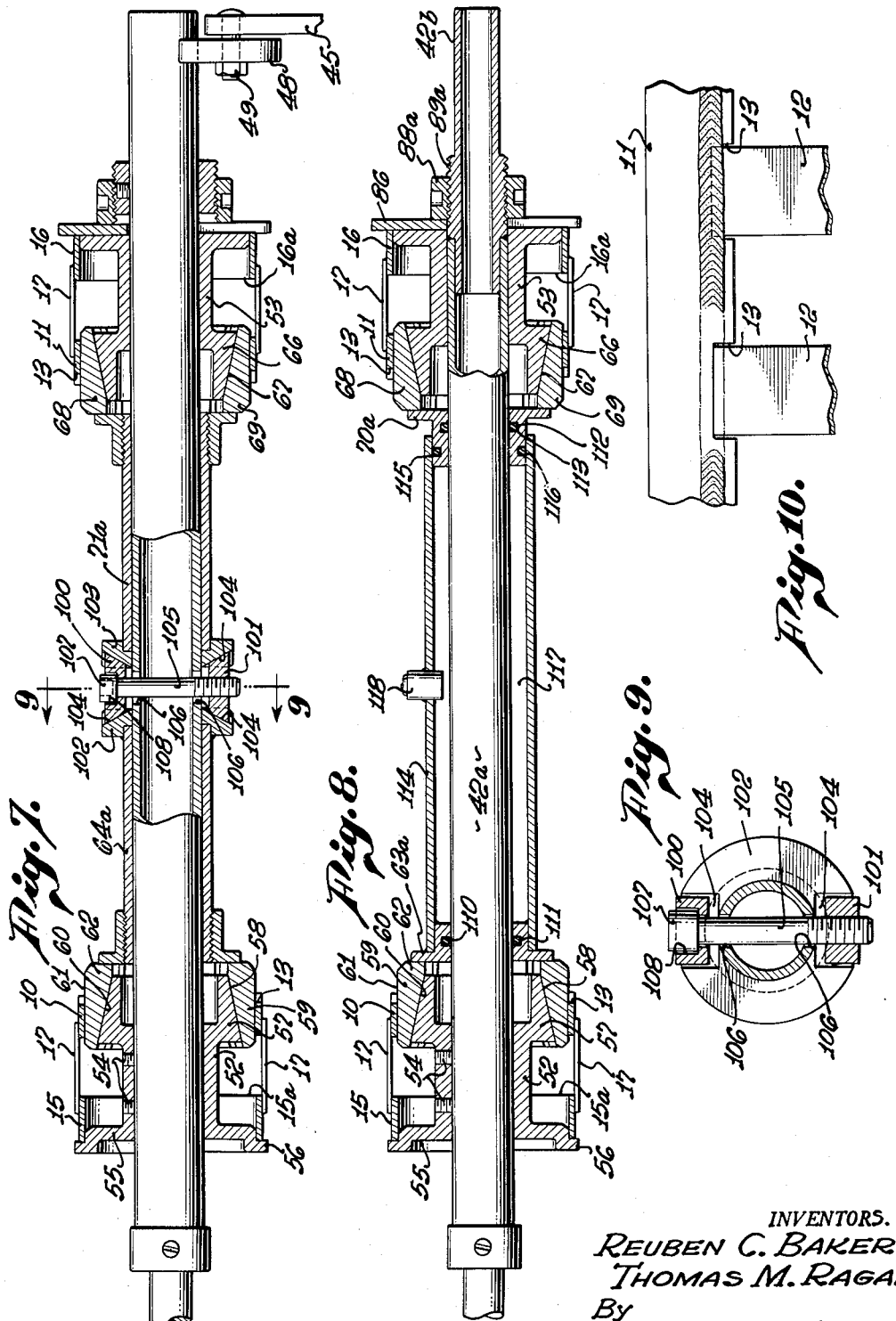

June 19, 1956 R. C. BAKER ET AL 2,750,911
ROTATABLE, EXPANSIBLE WELDING FIXTURE
Filed Sept. 26, 1949 4 Sheets-Sheet 4

INVENTORS.
REUBEN C. BAKER,
THOMAS M. RAGAN,
By
Meelin and Hanscom
ATTORNEYS

United States Patent Office 2,750,911
Patented June 19, 1956

2,750,911

ROTATABLE, EXPANSIBLE WELDING FIXTURE

Reuben C. Baker, Coalinga, and Thomas M. Ragan, Downey, Calif., assignors to Baker Oil Tools, Inc., Vernon, Calif., a corporation of California Application September 26, 1949, Serial No. 117,910

7 Claims. (Cl. 113—103)

This invention relates to the production of centering devices, which have the purpose of maintaining casings, liners, or similar conduits, substantially centralized or centered in well bores.

Centering devices have been mounted on well casings to centralize the latter in a well bore. These devices are of several specific designs. One particular type embodies outwardly bowed leaf springs that are welded to longitudinally spaced collars. Heretofore, the welding operation has taken substantial time, and has imparted a considerable amount of heat to the spring members in the region of the weld, causing the spring members to lose their temper, and requiring subsequent heat treatment to restore the temper. It is apparent that the prior methods of welding entail substantial expense and increase the cost of production considerably.

Accordingly, it is an object of the present invention to provide a method of welding well casing centering equipment, that does not remove the temper from the spring members where the temper is required, and which enables the component parts of the centering device to be welded together in an exceedingly rapid and facile manner.

Another object of the invention is to provide a method of manufacturing casing centering devices, in which the component parts can be clamped together very quickly prior to the welding operation, and in which the welded centralizer can be removed rapidly from the welding apparatus.

A further object of the invention is to provide apparatus for enabling the component parts of a centralizer to be clamped in assembled relation in a fast and easy manner, and which also facilitates the welding operation, which integrates the parts to one another.

Yet another object of the invention is to provide a casing centralizer having springs welded to longitudinally spaced collar members, in which the weld actually reinforces the springs and does not substantially affect the spring temper adversely.

This invention possesses many other advantages and has other objects which may be made more clearly apparent from a consideration of several forms in which it may be embodied. The forms of apparatus for practicing the method are shown in the drawings accompanying and forming part of the present specification, which will now be described in detail, for the purpose of illustrating the general principles of the invention. It is to be understood, however, that such detailed description is not to be taken in a limiting sense, since the scope of the invention is best defined by the appended claims.

Referring to the drawings:

Fig. 2 is an end elevation taken along the line 2—2 on Fig. 1;

Fig. 3 is a longitudinal section through a fixture forming part of the welding apparatus, with parts of a casing centering device mounted thereon;

Fig. 4 is a cross-section taken along the line 4—4 on Fig. 3;

Fig. 5 is a cross-section taken along the line 5—5 on Fig. 3;

Fig. 6 is a cross-section taken along the line 6—6 on Fig. 3;

Fig. 7 is a view similar to Fig. 3 of a modified form of fixture;

Fig. 8 is a view similar to Fig. 3 of still another modified form of fixture;

Fig. 9 is an enlarged cross-section taken along the line 9—9 on Fig. 7;

Fig. 10 is a fragmentary partial view, in a single plane, of several springs welded to a centering collar;

Figure 11:
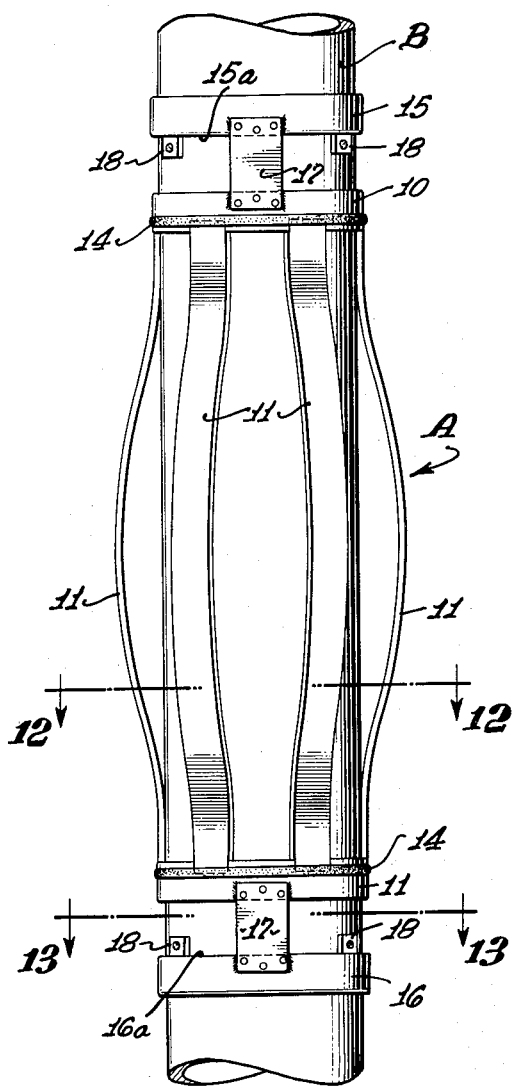
Fig. 11 is a side elevation of a casing centralizer, produced with the apparatus and method disclosed in the other figures.
Figure 12:
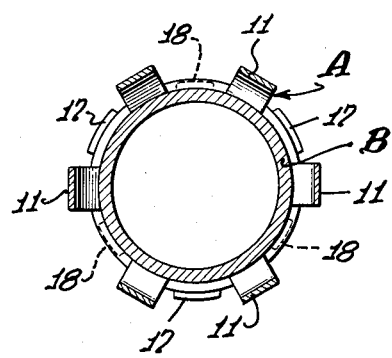
Figure 13:
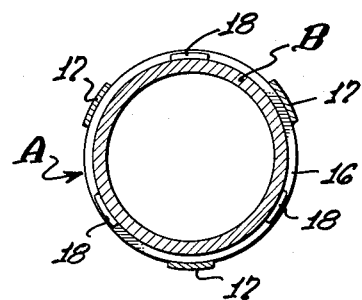

Figs. 12 and 13 are cross-sections taken along the lines 12—12 and 13—13, respectively, on Fig. 11.

The method and apparatus for producing well casing centering equipment will be described specifically in connection with a particular form of device illustrated in Fig. 11, although it is to be understood that the method and apparatus is useful in conjunction with other specific centering devices.

The centering device A shown in Fig. 11 is adapted to be mounted on a casing string B disposed in a well bore. The centering device includes upper and lower longitudinally spaced collar members 10, 11 slidable on the casing. To these collar members are welded longitudinally extending, outwardly bowed leaf springs 12, that are circumferentially spaced uniformly around the collars. The ends of the springs are received within inner notches or recesses 13 in the collars, and such ends are also welded to the collars as by running a bead 14 completely around each collar and over the ends of the springs themselves.

The welding of the outwardly bowed springs 12 to the collars 10, 11 serves to hold the latter longitudinally in spaced relation. Of course, the springs may be deflected inwardly towards the collars, which will cause the collars to move away from each other to a certain extent.

A stop collar 15 or 16 is disposed longitudinally outwardly of each collar member, and is secured in spaced relation to the latter by means of circumferentially spaced straps or tie members 17, that may be spot welded to the stop collars 15, 16 and the centering collars 10, 11. These stop collars or rings are spaced outwardly from the collar members 10, 11 in order to cooperate with stop members or lugs 18 welded to the casing B.

The centering device A is mounted on the casing string B with the springs 12 in an unconfined state and the stop elements or lugs 18 are placed adjacent the inner edges 15a, 16a of the stop rings 15, 16 and are welded to the casing when in this location. The casing is then inserted in the well bore, the walls of the confining bore hole tending to urge the springs 12 inwardly towards the casing. During lowering of the casing string in the well bore, the lower stop lugs 18 engage the lower stop collars 16 and tend to pull the casing centralizer through the well bore, such pulling action facilitating inward collapsing of the springs. As the springs move inwardly, the upper spring collar 10 and stop collar 15 move upwardly, such upward motion being permitted because of the initial longitudinal space allowed between the upper stop lugs 18 and the spring collar 10.

Similarly, upward movement of the casing string B would cause the upper stop lugs 18 to engage the upper stop collar 15, and pull the centralizer through the well bore.

The present invention enables the springs 12 to be welded to the collars 10, 11 in a rapid manner, and without destroying the temper of the springs to any appreciable extent. To accomplish this purpose, the components of a centering device are mounted on a fixture C, which is then rotated at a predetermined speed to enable the continuous weld 14 to be run around each collar 10, 11, in order to integrate both ends of the springs 12 to the respective collars.

The welding equipment disclosed in the drawings operates essentially in an automatic manner, to hold a welding rod 20 in proper spaced relation to the spring collar 10 or 11 during the time that the fixture and centralizer parts are being rotated at a proper rate of speed. The fixture C itself is secured to a horizontal drive shaft 21 rotatable in spaced bearings 22 carried on standards 23 suitably secured to the base 24 of the apparatus. The shaft is rotated at a predetermined speed, which is relatively slow, by means of a motor and gear reducer 25, which drives a drive pulley 26 that transmits its motion through a belt 27 to a driven pulley 28 suitably fixed to the drive shaft 21.

Figure 1:
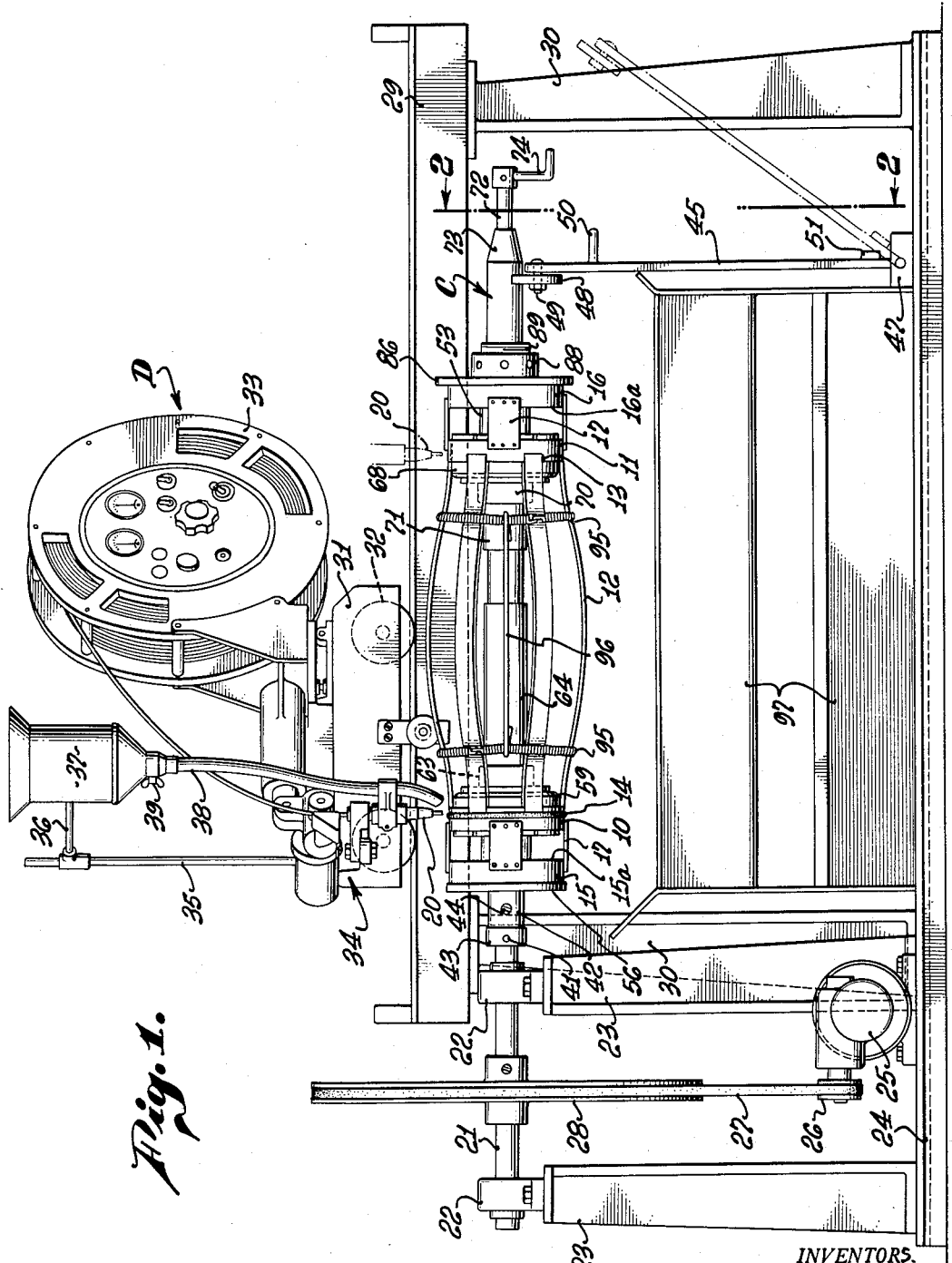
Figure 1 is a front elevation of a welding apparatus used in welding the components of a spring type of casing centralizer to one another.

The welding machine D is mounted to the rear of the fixture C (as seen in Fig. 1) and is supported on a track structure 29 resting on the upper ends of a plurality of standards or uprights 30, suitably secured to the base 24 of the equipment. The welding carriage 31 has a plurality of rollers 32 along which the welding equipment can be moved generally parallel to the welding fixture C. This carriage supports a reel 33 on which the welding rod 20 is wound, the welding rod extending through a suitable feeding device 34 with the end of the rod being adapted to be located above and adjacent one of the spring collars 10 or 11.

An upright 35 is also secured to the carriage 31 and carries a generally horizontal arm 36 to which a hopper 37 is secured. Flux contained in this hopper will flow through a suitable feed tube 38 to the region where the welding operation is taking place, the flow of flux being controlled by a suitable butterfly valve member 39 in the end of the hopper.

The carriage 31 may be disposed on the track structure 29, so as to locate the end of the welding rod 20 at the proper welding point at one spring collar 10. After the springs 12 have been welded to the collar at this point, the carriage 31 may be rolled along the track, as to the right, to dispose the end of the welding rod 20 and the flux tube 38 immediately above and adjacent the other spring collar 11, so as to weld the other ends of the springs 12 to this collar.

The welding unit, by itself, forms no part of the present invention. A description of its details in this specification is unnecessary to an understanding of the present invention.

The centralizer components may be mounted on a fixture C of the specific type disclosed in Figs. 1 to 6, inclusive. This fixture includes a head 40 secured to the inner end of the drive shaft 21 in any suitable manner, as by use of a set screw 41, the head being piloted within a hollow drive shaft 42, with the head flange 43 engaging the end of the hollow drive shaft. The latter is fixed to the head 40 by a pin 44, and extends in front of the welding apparatus to another standard or vertical support 45 that is secured to a pin 46 rotatable in a pair of brackets 47 suitably welded or otherwise secured to the base 24 of the equipment. The end of the hollow shaft 42 is carried by the pivoted support 45, by being cradled between a pair of rollers 48 rotatably mounted on pins 49 fixed to the upper end of the support 45. The pivoted standard 45 may be moved to a vertical shaft supporting position by means of a suitable handle 50 welded to its pivot 46 free of the shaft, to enable the centralizer parts to be mounted on the fixture C, and to permit the welded centralizer to be moved from the fixture. Such outward swinging movement (shown in broken lines in Fig. 1) is limited by engagement of a stop 51 on the standard with the brackets 47.

The fixtures includes a pair of opposed expander members 52, 53 rotatable with the hollow drive shaft 42. As disclosed most clearly in Fig. 3, the left-hand expander member 52 is secured to the drive shaft 42 in any suitable manner, as through use of a plurality of set screws 54, and includes an outer disc portion 55 whose periphery is of substantially the same diameter as the diameter of a stop collar 15, in order that the latter may be mounted thereon. This stop collar 15 is engageable with an abutment flange 56 extending outwardly from the peripheral portion. The inner portion 57 of the expander member is formed of frusto-conical shape, the tapered surface 58 of the conical member cooperating with a plurality of circumferentially arranged wedges 59 having inner surfaces 60 companion to the tapered conical surfaces 58 and having their outer surfaces 61 substantially parallel to the hollow shaft axis and adapted to engage the inner surface of a spring collar 10. The inner or large ends 62 of these wedge segments 59 engage a thrust plate 63 secured to a sleeve 64 mounted on the hollow drive shaft 42, and extending therealong.

A similar expander and holding element 53 is provided at the other end of the fixture on the hollow drive shaft 42. Thus, an outer disc 65 extends upwardly from the hub portion of the device 53, the periphery of the disc having substantially the same inside diameter as the inside diameter of the stop collar 16. Extending inwardly from the hub portion and toward the other expander member is a frusto-conical expander 66 having its tapered surface 67 cooperable with encompassing wedge segments 68, which are adapted to engage the inner surface of another spring collar 11. The large ends 69 of these segments also engage a thrust plate 70 secured to another sleeve 71 mounted on the hollow drive shaft 42.

The wedges 59, 68 are moved up along their companion conical expanders 57, 66, to force them outwardly into firm gripping engagement with the inner surfaces of the spring collars 10, 11, by moving the thrust plates 63, 70 in opposite directions away from one another. As disclosed in Figs. 1 to 6, inclusive, such opposite movement may be produced by a shaft 72 extending into the hollow drive shaft 42 and projecting outwardly from its right end. This shaft 72 is rotatable in a head 73 secured within the right end of the hollow drive shaft 42 in any suitable manner, this head being externally tapered so as to guide the pivoted standard 45 to its upright position when moved from the dotted line position, disclosed in Fig. 1. A removable crank 74 may be suitably secured to the outer end of the shaft 72, in order to rotate the latter in opposite directions.

The shaft 72 extends inwardly and has a threaded or feed screw portion 75 at its inner end mounted within a cooperable nut 76. A plurality of cap screws 77 are threaded into the nut and extend through longitudinal slots 78 in the hollow drive shaft 42, and through suitable holes 79 in the thrust plate sleeve 64. The shaft 72 is also rotatable within another sleeve 80 disposed within the shaft 42, to which a plurality of cap screws 81 are threadedly secured, such screws extending through longitudinal slots 82 in the hollow drive shaft 42 and through holes 83 formed in the other thrust sleeve 71. Relatively longitudinal movement between the sleeve 80 and the shaft 72 is prevented by providing spaced collars 84 on the shaft on opposite sides of the sleeve and in engagement with its ends, the collars being secured to the shaft by set screws 85 or the like.

The stop collar 16 shown at the right of the drawings is mounted on the disc 65, its outer end being adapted to engage an abutment plate 86 having a transverse slot 87, to enable the plate to be moved endwise over the hollow shaft 42 (as seen in Fig. 6). A clamp nut 88 is engageable with the outer face of the plate 86, this collar being threadedly and adjustably mounted on a threaded collar 89 secured to the hollow shaft 42 by set screws 90 or the like.

Each set of end members 10, 17, 15 and 11, 17, 16 to which the outwardly bowed springs 12 are secured are prefabricated prior to their being mounted on the fixture C. Thus, the straps 17 are welded to a stop collar 15 or 16 and to a centralizer or spring collar 10 or 11, holding the two collar members in proper longitudinally spaced relation. The pivoted standard 45 is swung downwardly, clear of the end of the fixture C, which enables a stop collar, strap and spring collar combination 15, 17, 10 to be moved over the free end of the hollow shaft 42 and disposed on the left expanding and holding device 52, 59. The stop collar 15 is disposed on the disc 55, with its end engaging the abutment flange 56, and the spring collar 10 is mounted on the wedge segments 59, which, at this time, are loose with respect to the spring collar, being located downwardly along the wedge surface 58 of the conical expander 57.

The stop collar, strap and spring collar arrangement 16, 17, 11 for the other end of the casing centralizer is then moved over the fixture, with the spring collar 11 encompassing the gripping segments 68 and the stop collar 16 being disposed around the periphery of the disc 65. The thrust plate 86 is then moved transversely over the shaft into a position in which it will serve as an abutment for the stop collar or ring 16. Thereafter, the clamp nut 88 can be rotated on the collar 89 to move the abutment plate 86 up against the right-hand disc 65.

The crank arm 74 may then be placed on the outer end of the shaft 72 and the latter rotated in the proper direction. Such rotary movement will feed the nut 76 along the shaft 42 in one direction, as to the left. Because of the engagement of the collar 84 with the sleeve 80, the latter is urged in the other direction, or to the right. Since the nut 76 is connected to the thrust sleeve 64, and since the other sleeve 80 is connected to the right-hand thrust sleeve 71, rotation of the shaft 72 in the proper direction will move the sleeves 64, 71 away from each other along the hollow drive shaft 42, and will force the respective thrust plates 63, 70 against the wedge segments 59, 68, moving the latter upwardly along the expander wedges 57, 66 and outwardly into wedging engagement with the collars 10, 11.

When the collars 10, 11 are mounted on the fixture C, their inner end recesses or notches 13 are placed in alignment with one another. The outwardly bowed leaf springs 12 are then placed in proper position between the spring collars 10, 11, the ends of the springs being disposed within the notches 13. In the event that the distance between the inner ends of the notches is different from the free length of the springs, suitable adjustment can be made by loosening the wedges 59, 68 and by rotating the clamp nut 88 in the proper direction, which will either feed the spring collars 10, 11 toward one another the proper amount, or which will enable the spring collars 10, 11 to be moved further apart, depending upon the direction in which the clamp nut 88 has been rotated. Thereafter, the feed screw shaft 72 is rotated to wedge the segments 59, 68 within the collars 10, 11.

After several springs 12 are mounted in position between the collars, with their ends in the notches, they are prevented from falling out by disposing a coil or belly band spring 95 around them. The fixture C is rotated by hand, as by turning the pulley 28, and the bowed springs 12 are inserted within the belly band springs 95, and appropriately mounted in the notches 13, until the required number of springs has been properly mounted between the collars 10, 11 with their outer ends disposed completely within the notches 13. Thereafter, a suitable hook 96 may be placed between the belly band springs 95, which urges them upwardly along the bowed springs 12, and tends to keep the latter radially inwardly within the notches 13, and bearing against the outer surfaces of the wedge segments 59, 68.

With all of the centralizer components assembled in proper relation on the fixture C, the springs 12 can be welded to their respective collars 10, 11. The hopper 37 is filled with flux and the welding equipment moved along the track 29 and suitably adjusted so that the end of the welding rod 20 is disposed substantially in a transverse plane including the ends of the springs 12 at one end of the centralizer device. The motor 25 is then started to rotate the drive shaft 42 at the proper speed, and the flux allowed to flow down through the tube 38 onto the work at the region of the end of the welding rod 20. The current flows between the electrode 20 and the work effects a welding and the formation of a welding bead 14 around the entire collar 10 or 11 as the drive shaft rotates. The welding equipment automatically feeds the welding rod 20 and maintains the arc, which actually cannot be seen because of the surrounding flux flowing through the tube 38. The excess flux drops from the work into a suitable receiving bin or receptacle 97 below the fixture C.

As the work rotates and the ends of the springs 12 are fed under the welding rod 20, the welding material integrates such spring end to the collar. Of course, the welding bead 14 is also formed on the collar between the springs, but this does not adversely affect the weld at each spring end. As a matter of fact, as pointed out hereinafter, it actually reinforces the weld. After the work has made a complete revolution, a continuous weld 14 has been formed around the collar 10, integrating the ends of all of the springs 12 to the collar. Thereafter, the welding equipment is rolled along the track 29 until the welding rod 20 is disposed at the other collar 11 (as the right collar), the flux being fed through the tube 38 to the end of the welding rod, and the equipment rotated at the proper speed to form a similar welding bead 14 continuously around the collar 11, in order to integrate the ends of the springs 12 to the right-hand collar 11.

After the work has made a complete revolution, the welding operation has been completed and the assembled equipment may be moved out of the way, the clamp nut 88 being loosened, which allows the abutment plate 86 to be removed and the entire fabricated centralizer device A moved off the fixture C, as towards the right thereof. The pivoted standard 45 is swung out of the way to enable this operation to take place. The belly band springs 95 and intervening hook 96 may also be removed, enabling them to be used again in conjunction with another assemblage of parts placed on the fixture C.

The welding operation takes place in a comparatively rapid manner. As an example, a collar of about five and one-half (5.5) inches outside diameter can have springs 12 welded to it in about thirty (30) seconds. That is, once the welding equipment is started in operation, the drive shaft 42 is rotated one complete revolution in about thirty seconds to form a bead 14 around the entire collar, integrating the springs thereto. The comparatively rapid mode of welding allows insufficient time for heat to be imparted to each spring 12. As a result, it is found that the springs do not have their temper impaired, and that they may be flexed repeatedly without breaking at the weld 14, or at an area adjacent to the weld. This action is not only due to the fact that the heat is localized and does not move over any extended area of each spring, but the bead 14 itself has a certain thickness and actually reinforces the end of each spring. For that matter, the length of the bead between the ends of adjacent springs also serve to reinforce the entire bead, and act jointly with the portion of the bead at the end of the spring itself to strengthen the entire structure.

It is, accordingly, seen that the components of a casing centralizer can be assembled and clamped in assembled relation to the fixture in a rapid manner, and that the welding operation can be performed very quickly. All of these factors contribute to a substantial decrease in the cost of production of a centralizing device, as well as resulting in a device that is stronger than those manufactured heretofore.

A modified form of centralizer device is disclosed in

Fig. 7. In this form, the abutment sleeves 64a, 71a are urged in opposite directions, to clamp the wedge segments 59, 68 under the spring collars 10, 11, by moving a plurality of wedges 100, 101 in a transverse direction. Thus, the inner ends of the abutment sleeves 64a, 71a have head members 102, 103 welded or otherwise suitably secured thereto. There are a pair of wedge surfaces 104 on each head member 102, 103, the surfaces on one member being inclined inwardly toward the companion surface on the other member. A pair of wedge blocks 100, 101 are cooperable with opposed wedge surfaces 104 on each head. One block 101 is threaded for the reception of a threaded stem 105 extending through a pair of longitudinally extending slots 106 in the hollow drive shaft 42, the head 107 of the stem being received in a suitable socket 108 in the other block 100. By rotating the threaded stem 105, the wedge blocks 100, 101 are moved inwardly toward each other, urging the abutment heads 102, 103 and sleeves 64a, 71a outwardly away from each other, and thereby shifting the wedges 59, 68 along their companion expander surfaces and outwardly into clamping engagement with the spring collars 10, 11.

Rotation of the stem 105 in the opposite direction will loosen the various wedge members and allow the wedge segments 59, 68 to be loosened from the spring collars 10, 11.

In all other respects, the fixture disclosed in Fig. 7 is used and operates in the same manner as the device illustrated in Fig. 3.

The fixture arrangement shown in Fig. 8 is designed for fluid wedging actuation. Thus, one of the thrust plates, as the left thrust plate 63a, is slidably mounted on the hollow shaft 42a and has a seal ring 110 mounted in a groove 111 and slidable along the exterior of the hollow shaft. Similarly, the other thrust plate 70a is also provided with an internal groove 112 containing a seal ring 113 adapted to slidably seal with the periphery of the hollow shaft 42a. A sleeve or cylinder 114 is welded to the left thrust plate 63a in leakproof relation, and is slidable along the other thrust member 70a, leakage between the cylinder sleeve 114 and the other thrust member 70a being prevented by a suitable piston ring 115 in the latter mounted in a ring groove 116 and slidably engaging the inner wall of the cylinder. The cylinder sleeve 114, hollow shaft 42a and thrust members 63a, 70a form an annular cylinder space 117 from which and into which leakage of fluid cannot occur. The introduction of air under pressure into the cylinder space 117 will urge the thrust plates 63a, 70a in opposite directions away from each other, and will cause them to urge the wedging segments 59, 68 along the expander cones 57, 66 and into engagement with the spring collars 10, 11. Release of the air pressure will allow the wedges 59, 68 to move down along the expander cones free from engagement with the spring collars 10, 11. The introduction and release of air may be accomplished by aid of a suitable air valve 118 secured to the cylinder sleeve 114 and communicating with its interior 117.

The hollow shaft arrangement disclosed in Fig. 8 may be the same as in the other forms of the invention, or may be of composite construction, including an outer portion 42b piloted within the main shaft portion 42a and suitably welded thereto. The outer portion may have a threaded section 89a for cooperation with a clamp nut 88a, which can be rotated into and out of engagement with the abutment plate 86.

The inventors claim:

1. In a welding fixture: a rotatable shaft; a pair of oppositely facing tapered expanders mounted on said shaft to rotate therewith; means for preventing longitudinal movement of said expanders on said shaft; a set of segmental elements slidable longitudinally along each expander and laterally into clamping engagement with a member disposed around said set of elements; a pair of sleeve means between said sets of segmental elements and slidable in opposite directions along the exterior of said shaft and engageable with said sets of elements for shifting them along said expanders; and means including a shaft extending into said rotatable shaft for shifting said pair of sleeve means in opposite directions to move said sets of segmental elements longitudinally in opposite directions along said expanders.

2. In a welding fixture: a rotatable shaft; a pair of oppositely facing tapered expanders mounted on said shaft to rotate therewith; means for preventing longitudinal movement of said expanders on said shaft; a set of segmental elements slidable longitudinally along each expander and laterally into clamping engagement with a member disposed around said set of element; a pair of sleeve means between said sets of segmental elements and slidable in opposite directions along said shaft and engageable with said sets of elements for shifting them along said expanders; and means extending into said rotatable shaft and including wedge members shiftable transversely of said shaft for urging said pair of sleeve means in opposite directions to move said sets of elements longitudinally in opposite directions along said expanders.

3. In a welding fixture: a rotatable shaft; a pair of oppositely facing tapered expanders mounted on said shaft to rotate therewith; means for preventing longitudinal movement of said expanders on said shaft; a set of segmental elements slidable longitudinally along each expander and laterally into clamping engagement with a member disposed around said set of elements; a pair of sleeve means between said sets of segmental elements and slidable in opposite directions along said shaft and engageable with said sets of elements for shifting them along said expanders; and fluid operated means disposed between and operatively engaging said pair of sleeve means for shifting said pair of sleeve means in opposite directions along said shaft to shift said sets of elements longitudinally in opposite directions along said expanders.

4. In a welding fixture: a rotatable support; longitudinally spaced expanders on and rotatable with said support; means for preventing longitudinal movement of said expanders on said support; sets of segmental gripping elements cooperable with said expanders and movable laterally outward by said expanders in response to longitudinal movement of said sets of gripping elements in opposite directions; said sets of elements being longitudinally spaced from each other; means disposed between and operatively connected to said sets of elements for substantially simultaneously shifting said sets of elements longitudinally in opposite directions along said expanders to effect lateral outward movement of said elements into clamping engagement with a plurality of longitudinally spaced members mounted on said fixture; and means for simultaneously actuating said shifting means.

5. In a welding fixture: a rotatable support; longitudinally spaced oppositely facing expanders on and rotatable with said support, each expander having a plurality of surfaces thereon tapering toward the axis of said support; means for preventing longitudinal movement of said expanders on said support; sets of longitudinally spaced, oppositely facing segmental gripping elements having surfaces companion to and engaging said expander surfaces; said sets of gripping elements being movable laterally outward by said expanders in response to longitudinal movement of said sets of gripping elements in opposite directions; means slidable along said support between and operatively connected to said sets of elements for substantially simultaneously shifting said sets of elements longitudinally in opposite directions along said expanders and laterally outward into clamping engagement with one or more members mounted on said fixture; and means for simultaneously actuating said shifting means.

6. In a welding fixture: a rotatable support; longitudinally spaced oppositely facing expanders on and rotatable with said support, each expander having a plurality of surfaces thereon tapering toward the axis of said support; means for preventing longitudinal movement of said expanders on said support; sets of longitudinally spaced, oppositely facing segmental gripping elements having surfaces companion to and engaging said expander surfaces; said sets of gripping elements being movable laterally outward by said expanders in response to longitudinal movement of said sets of gripping elements in opposite directions; means movable along said support between and operatively connected to said sets of elements for substantially simultaneously shifting said sets of elements longitudinally in opposite directions along said expanders and laterally outward into clamping engagement with one or more members mounted on said fixture, said shifting means including a pair of sleeves shiftable in opposite directions along the exterior of said support; and means for simultaneously actuating said shifting means.

7. In a welding fixture: a rotatable shaft; a pair of oppositely facing expanders mounted on said shaft to rotate therewith; means for preventing longitudinal movement of said expanders on said shaft; a set of segmental elements slidable longitudinally along each expander and laterally into clamping engagement with a member disposed around said set of elements in response to longitudinal movement of said sets of gripping elements in opposite directions; a pair of sleeve means disposed between said sets of elements and slidable in opposite directions along said shaft and engageable with said sets of elements for shifting them along said expanders; means including a second shaft extending into said rotatable shaft for simultaneously shifting said pair of sleeve means in opposite directions to move said sets of segmental elements longitudinally along said expanders; said shifting means including a nut member on said second shaft connected to one of said sleeve means, said nut member being threaded on said second shaft to be moved longitudinally of said rotatable shaft in response to rotation of said second shaft with respect to said rotatable shaft.

References Cited in the file of this patent

UNITED STATES PATENTS

| Number | Name | Date |
|---|---|---|
| 291,282 | Blue | Jan. 1, 1884 |
| 410,630 | Ashworth | Sept. 10, 1889 |
| 1,016,738 | Curry | Feb. 6, 1912 |
| 1,642,825 | Pearce | Sept. 20, 1927 |
| 1,988,129 | Martin | Jan. 15, 1935 |
| 2,080,906 | Boyer | May 18, 1937 |
| 2,104,622 | Mendive | Jan. 4, 1938 |
| 2,147,367 | George | Feb. 14, 1939 |
| 2,167,338 | Murcell | July 25, 1939 |
| 2,233,455 | Larson | Mar. 4, 1941 |
| 2,272,698 | Garrett | Feb. 10, 1942 |
| 2,312,600 | Steps | Mar. 2, 1943 |
| 2,339,543 | Bishop | Jan. 18, 1944 |
| 2,352,580 | Wettengel | June 27, 1944 |
| 2,353,868 | Bisbee et al. | July 18, 1944 |
| 2,388,416 | Johnson | Nov. 6, 1945 |
| 2,440,698 | Patterson | May 4, 1948 |
| 2,460,325 | Whitson et al. | Feb. 1, 1949 |
| 2,495,545 | Peterson et al. | Jan. 24, 1950 |
| 2,522,459 | Mitchell | Sept. 12, 1950 |
| 2,525,680 | Ingemarson | Oct. 10, 1950 |
| 2,558,360 | Jadoul | June 22, 1951 |
| 2,615,413 | Adams | Oct. 28, 1952 |